(12) United States Patent
Rosemeyer

(10) Patent No.: US 10,898,787 B2
(45) Date of Patent: Jan. 26, 2021

(54) WALKER-SHAPED HOVERBOARD ATTACHMENT

(71) Applicant: Maurice Rosemeyer, Bracebridge (CA)

(72) Inventor: Maurice Rosemeyer, Bracebridge (CA)

(*) Notice: Subject to any disclaimer, the term of this patent is extended or adjusted under 35 U.S.C. 154(b) by 0 days.

(21) Appl. No.: 15/851,039

(22) Filed: Dec. 21, 2017

(65) Prior Publication Data

US 2019/0016407 A1 Jan. 17, 2019

Related U.S. Application Data

(60) Provisional application No. 62/531,436, filed on Jul. 12, 2017.

(51) Int. Cl.
| | |
|---|---|
| *A63C 17/28* | (2006.01) |
| *A61G 5/04* | (2013.01) |
| *A61G 5/10* | (2006.01) |
| *B62K 13/06* | (2006.01) |
| *A63C 17/01* | (2006.01) |
| *A63C 17/08* | (2006.01) |
| *A63C 17/26* | (2006.01) |
| *B62K 11/00* | (2006.01) |
| *A61H 3/04* | (2006.01) |
| *B62K 5/007* | (2013.01) |
| *B62K 23/06* | (2006.01) |
| *B62K 23/08* | (2006.01) |
| *A63C 17/12* | (2006.01) |

(52) U.S. Cl.
CPC ............ *A63C 17/28* (2013.01); *A61G 5/04* (2013.01); *A61G 5/043* (2013.01); *A61G 5/047* (2013.01); *A61G 5/10* (2013.01); *A61H 3/04* (2013.01); *A63C 17/014* (2013.01); *A63C 17/08* (2013.01); *A63C 17/265* (2013.01); *B62K 5/007* (2013.01); *B62K 11/007* (2016.11); *B62K 13/06* (2013.01); *B62K 23/06* (2013.01); *B62K 23/08* (2013.01); *A63C 17/12* (2013.01); *A63C 2201/10* (2013.01); *A63C 2203/06* (2013.01)

(58) Field of Classification Search
CPC ..... A63C 17/28; A63C 17/12; A63C 2201/10; A63C 17/014; A63C 17/08; A63C 17/265; A63C 2203/06; A61G 5/04; A61G 5/041; A61G 5/047; A61G 5/10; A61G 5/043; A61H 3/04; B62K 11/007; B62K 5/007; B62K 23/06; B62K 23/08
USPC ........................................................ 280/826
See application file for complete search history.

(56) References Cited

U.S. PATENT DOCUMENTS

| | | | | |
|---|---|---|---|---|
| D567,151 S | * | 4/2008 | Owens | D12/130 |
| 9,744,095 B1 | * | 8/2017 | Mazzei | B62K 5/007 |
| 9,988,114 B1 | * | 6/2018 | Freakes | B62K 1/00 |
| 2017/0203811 A1 | * | 7/2017 | Germanovsky | B62K 13/06 |
| 2018/0141609 A1 | * | 5/2018 | Newhouse | B62K 13/08 |

* cited by examiner

*Primary Examiner* — John D Walters
(74) *Attorney, Agent, or Firm* — IPS Legal Group, P.A.

(57) ABSTRACT

A walker-shaped hoverboard attachment provides a center platform having a cavity and a rim around the cavity configured to rest on either side of a hoverboard's upper surface. Support rails and crossbars collectively configured as a walker may be fixedly connected to the platform. One or more brakes on one or more grips may enable a user to control the hoverboard while a user is standing on the platform.

8 Claims, 4 Drawing Sheets

WALKER-SHAPED HOVERBOARD ATTACHMENT

CROSS-REFERENCE TO RELATED APPLICATION

This application claims priority to U.S. Provisional Application No. 62/531,436 filed on Jul. 12, 2017, the disclosure of which, including any materials incorporated by reference therein, is incorporated herein by reference in its entirety.

TECHNICAL FIELD

The present invention relates generally to motorized transport. More particularly, the present invention concerns a walker-shaped HOVERBOARD attachment.

BACKGROUND

HOVERBOARDS, or self-balancing and self-propelling two-wheeled platforms, are a very popular transportation medium. Not only are they a stylish way to travel, their stable-ride technology provides a smooth transportation experience. However, this technology has so far only been applied to two-wheeled platforms suitable for standing upon. As such, significant musculoskeletal coordination is still required to use HOVERBOARDS, and accidents do happen. This leaves the mobility-impaired person unable to utilize this fun and convenient technology. What is needed, therefore, is an attachment for a HOVERBOARD having adaptions for a walker.

An attempt to meet this need can be seen with respect to U.S. Pat. No. 3,398,974, which generally discloses a walker adaptation for a motorized wheelchair. While this disclosure does generally provide for a walker/wheelchair combination, it fails to incorporate HOVERBOARD technology.

Another attempt can be seen with respect to U.S. Pat. No. 9,655,806, incorporated by reference in its entirety herein, which generally discloses an advanced walker. However, this disclosure also fails to disclose a HOVERBOARD-powered configuration.

Yet another attempt can be seen with respect to the disclosures of U.S. Pat. Nos. 4,280,578 and 6,378,883 incorporated in their entireties by reference herein, which generally disclose motorized walkers. However, they also fail to disclose mobility-assistance systems configured for use with a HOVERBOARD.

As can be seen, various attempts have been made to solve the problems which may be found in the related art but have been unsuccessful. A need exists for a new walker-shaped HOVERBOARD attachment to avoid the challenges and problems with the prior art.

SUMMARY OF THE INVENTION

It is to be understood that in the present disclosure, all embodiments are provided as illustrative and non-limiting representatives of many possible embodiments. In addition, the terms "is," "can," "may," and the like are herein used as synonyms for and interchangeable with terms such as "may," "may provide for," "it is contemplated that the present invention may" and so forth.

Furthermore, all elements listed by name, such as a seat, handlebar, support rod, etc., are herein meant to include or encompass all equivalents for such elements. For example, in addition to a "seat," any item configured to be sat upon is also contemplated by the present invention. Such equivalents are contemplated for each element named in its particular herein.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention provides a novel solution for personal transportation. The general purpose of the present invention, which shall be described subsequently in greater detail, is to allow a user to utilize a walker powered at least in part by HOVERBOARD technology. The features of the invention are believed to be novel and to have been particularly pointed out and distinctly claimed in the concluding portion of the specification. These and other features, aspects, and advantages of the present invention may become better understood with reference to the following drawing and detailed description.

Numerous advantages and aspects of the invention may be apparent to those skilled in the art upon consideration of the following detailed description taken in conjunction with the drawings which generally provide illustrations of the invention in its preferred embodiments as they relate to an attachment for a HOVERBOARD having adaptions for a walker.

While the invention may be described in connection with mobility-challenged persons, it is understood that the invention is not limited in scope to use with mobility challenged persons, but may be used with any person wanting to experience this type of HOVERBOARD experience.

The present invention comprises an attachment for a HOVERBOARD having adaptions for a walker. In some embodiments, the present invention provides for a vehicle that rapidly attaches to a HOVERBOARD, rendering it safe and easy to use. It may reduce the injuries currently suffered by users of HOVERBOARDS and encourage the use of hover boards by the general public for short distance commuting, and avoid exhaust pollution associated with automobiles. The present invention provides for a seat with wheels that may swivel in the two rear legs and an arm attached to the center of a hover board. In order to ensure an adequate turning circle, the front pair of wheels of the vehicle may, and in some embodiments must, be able to swivel. The HOVERBOARD attachment can also be a mobility assistance device or can be self-balancing two-wheeled platforms.

Additionally, rollers may allow independent rotation of the left and right foot pads of the hover board. A wraparound may secure the bar.

To assist with applying the necessary pressure using one's feet when in a seated position, the present invention provides for two hand control levers, which press down on front and rear of each foot pad. This may be achieved by levers and cams. The control may be similar to controls used to steer tractors and lawn mowers. They may be easy to use and quite intuitive. If more weight on wheels is required due to terrain or encountering a steep slope, a user may revert to standing on the HOVERBOARD.

In some embodiments, the HOVERBOARD may provide the battery generated electric power, as well as the necessary thrust and control to drive and guide the attached vehicle, which may provide all the support, including emergency braking needed for a safe ride. An element, such as a support bar, may be provided in various locations of the present invention that a user may hold onto in order to prevent falling. One to six wheels may provide more stability than riding a hover board on its two wheels. Such wheels, indeed all wheels of the present invention, may be configured to swivel.

Because HOVERBOARDS vary in wheel size and thrust availability, in some embodiments the present invention may only work with HOVERBOARDS of certain specifications, in order to control maximum speed and control response.

Accordingly, in one or more preferred embodiments, any HOVERBOARD configured for use with the present invention, or for which the present invention may be configured, may be required to have a minimum rider weight limitation of 40 lbs. In some embodiments, such limitation may ensure that the problem of vibration caused by insufficient weight transferred to the HOVERBOARD foot pads is not encountered. Additionally, in some embodiments, weight distribution pads may be placed under one or more rocker arm shafts so as to ensure a significant weight is sensed by the HOVERBOARD foot pads.

It is contemplated that, in some embodiments, the wheels of the present invention may swivel. In some embodiments, the front wheels may swivel. In some embodiments, the rear wheels of the present invention may swivel. The present invention may provide for a variety of wheel sizes, including small wheels, bicycle wheels, or any other size or shape of wheel. The support vehicle may come in different shapes. They may have a wide stance to ensure safety. In other embodiments, the present invention may work with any HOVERBOARD.

The present invention may provide for a seat mounted on two or four wheels, attached to the center of the HOVERBOARD by an arm. While sitting the rider is required to apply pressure to the footpads on the hover board pushing down with your feet equivalent to body weight, even a child's weight of say 45 lbs. is not easy and almost impossible when encountering even a slight slope.

In some embodiments, the seat may be moved further forward and foot rests may be added on top of one or more rocker arms. In some embodiments, these and other modifications may be provided that allow the seat to be moved further forward. Such forward or backward movement of the seat may be provided by an adjustable seat configuration, or by designs of the present invention providing various fixed locations of seat configuration.

In some embodiments, the present invention may be square or round, and the wheels may be configured for smooth or off road. The present invention may also provide for baggage containers and/or clip on attachment for shopping carts.

Therefore, in some embodiments, the present invention may provide for a platform consisting of two or more wheels, generally two or four, that may attach to a commercially available HOVERBOARD. On the platform may be a walker-type support element or a different type of seat or standing element. In other embodiments, the present invention may provide for a four to six-wheeled embodiment, wherein the HOVERBOARD element is fixedly attached to or integrated within the present invention.

In some embodiments, the user may have the ability to use either the user's weight or hand controls to determine the pace, direction, and manner of movement of the present invention. It is contemplated that any and all commercially available safety measures applicable to the present invention may be incorporated within the present invention, such as emergency braking, advanced stability control, automatic balancing, self-driving technology, and any other such technology.

The unique features of this product may provide the following benefits for consumers everywhere: it may enable short distance commuting range, for example ten kilometer return trip, on a single battery charge; it may reduce the use of automobiles for short distance commuting; it may significantly reduce exhaust pollution; it may improves safety of HOVERBOARDS; it may improve a user's carbon footprint; and it may increase the use of battery powered vehicles.

BRIEF DESCRIPTION OF THE DRAWINGS

These and other features, aspects and advantages of the present invention may become better understood with regard to the following description, appended claims, and accompanying figures where:

DETAILED DESCRIPTION

Figure 1:
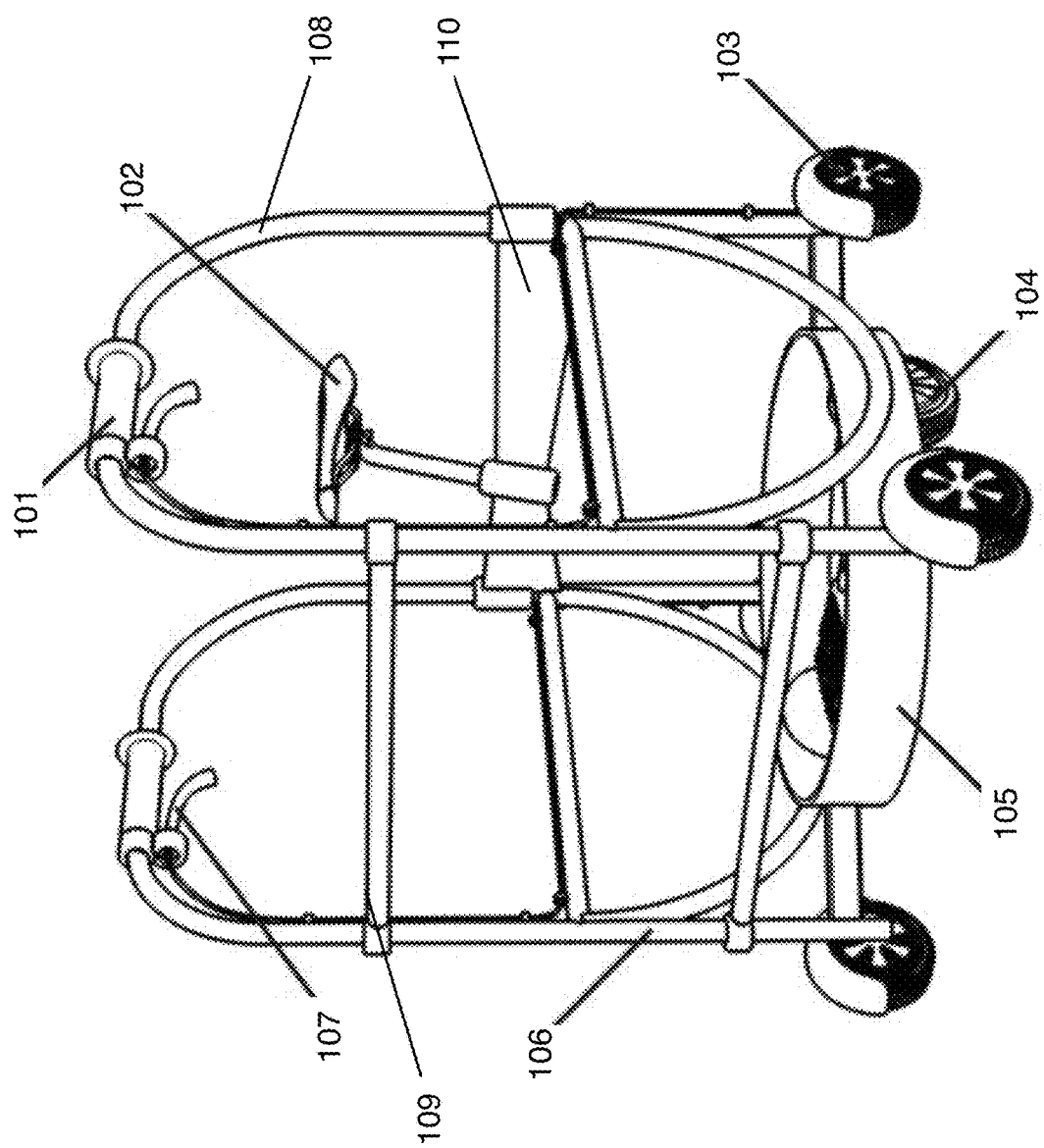
FIG. 1 shows a front perspective view of a walker-shaped HOVERBOARD attachment in accordance with one embodiment of the invention.

The present invention overcomes the limitations of the prior art by providing a new and more effective walker-shaped HOVERBOARD attachment.

All dimensions specified in this disclosure are by way of example only and are not intended to be limiting. Further, the proportions shown in these Figures are not necessarily to scale. As may be understood by those with skill in the art with reference to this disclosure, the actual dimensions and proportions of any embodiment or element of an embodiment disclosed in this disclosure may be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it may be understood by one of ordinary skill in the art that the embodiments may be practiced without these specific details. Well-known features, elements or techniques may not be shown in detail in order not to obscure the embodiments.

In some embodiments, the present invention may comprise a walker-shaped HOVERBOARD attachment having a) a platform defining at least one cavity and a rim surrounding the cavity, wherein the rim is configured to rest on either side of a HOVERBOARD; b) at least one wheel disposed on the platform; c) at least one support rail fixedly connected to the platform, wherein the at least one support rail extends orthogonally up from the platform; d) at least one grip disposed on the at least one support rail; e) at least one brake disposed on the at least one grip; f) at least one seat support bar fixedly connected to the at least one support rail; and g) at least one seat fixedly connected to the at least one seat support bar.

In some embodiments, the at least one support rail may be two arcuate support rails, wherein the rails go up orthogonally relative to the platform, curve into a half-moon or bow-shaped curve at their top, then proceed straight down orthogonally to make contact with the platform again.

In some embodiments, the present invention may further comprise at least one crossbar orthogonally disposed across at least two support rails. In some embodiments, the combination of crossbars and support rails may be shaped as a walker.

In some embodiments, the present invention may provide for four wheels. In embodiments wherein the support rails and crossbars together comprise a walker, each of the walker's legs, or ends of a support rail, may be fixedly connected to the platform, and may be located adjacent to the inside of a wheel.

In some embodiments, the at least one seat support bar may be two seat support bars fixedly connected to a support rail on one end of the seat support bar and a seat or seat post on the other end of the seat support bar. In some embodiments, the ends of the seat support bars closest to the seat may be positioned closer to the inside of the rim than the opposite seat support bar ends, thus positioning the seat more or less above the HOVERBOARD and/or the center of the rim's cavity.

Turning attention to FIG. 1, a front perspective view of a walker-shaped HOVERBOARD attachment in accordance with one embodiment of the invention is shown. In the embodiment depicted, a viewer may perceive hand grips 101, seat 102, wheels 103, motorized wheels 104, ring (configured to surround hover board) 105, walker frame 106, brakes 107, support rail 108, crossbar 109, and seat support bar 110.

It is contemplated that seat 102 may be of any shape or size known in the art, including but not limited to bucket shaped seats, banana seats, a chair with a belt, or any other shaped seat 102. As well, seat support bar 110 may be of any size or configuration necessary or desirable, or otherwise known in the art, to support seat 102.

It is contemplated that support rail 108 may be an element of walker frame 106. Although support rail 108 is shown in FIG. 1 (and elsewhere) in the dual support rail 108, both arcuate-shaped configuration known to be associated with traditional walkers, such shapes and configurations for support rail 108 may vary in different embodiments. For example, the various support rails 108 may provide for one or more crossbars 109 as disclosed in FIG. 1. However, in other embodiments, two or more crossbars 109 may be provided, or none. Additionally, one or more support rails 108 may not be arcuate, but may instead come to one or more right angles. In some embodiments, one support rail 108, two support rails 108 (as shown in FIG. 1), or three or more support rails 108 may be provided.

Figure 2:
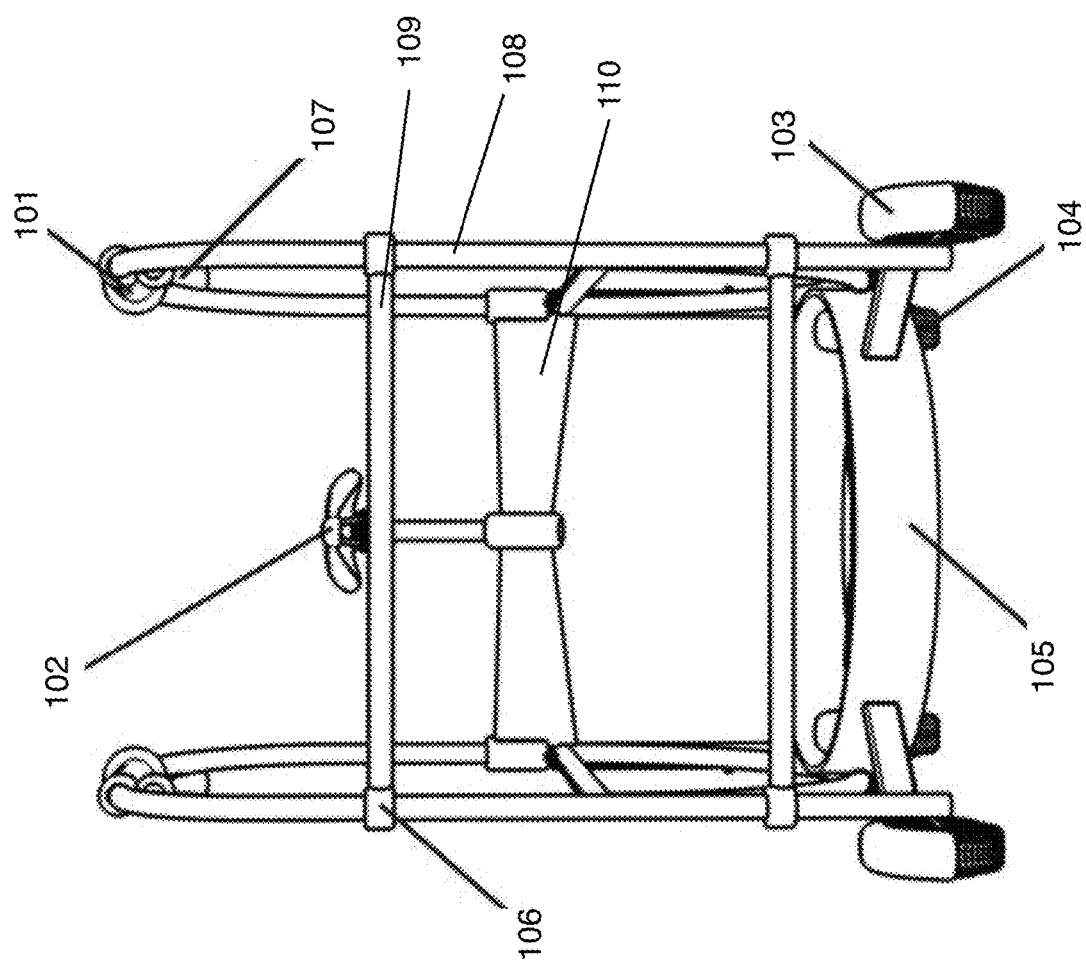
FIG. 2 shows a front view of a walker-shaped HOVERBOARD attachment in accordance with one embodiment of the invention.

With respect to FIG. 2, a front view of a walker-shaped—HOVERBOARD attachment in accordance with one embodiment of the invention is shown. In the embodiment depicted, a viewer may perceive hand grips 101, seat 102, wheels 103, motorized wheels 104, ring 105, walker frame 106, brakes 107, support rail 108, crossbar 109, and seat support bar 110.

FIG. 2 provides a different view of walker frame 106, showing its relative dimensions. Notably, as should be apparent to those of skill in the art, in some embodiments, walker frame 106 can be of any different shape known in the art from the shape of walker frame 106 as disclosed in FIG. 2.

FIG. 2 also discloses the relative depths of motorized wheels 104 in comparison with ring 105 and wheels 103. Again, as may be evident to those of skill in the art, the relative dimensions of motorized wheels 104 in comparison with ring 105 and wheels 103 may vary between embodiments and can take any relative dimension(s) known in the art.

Figure 3:
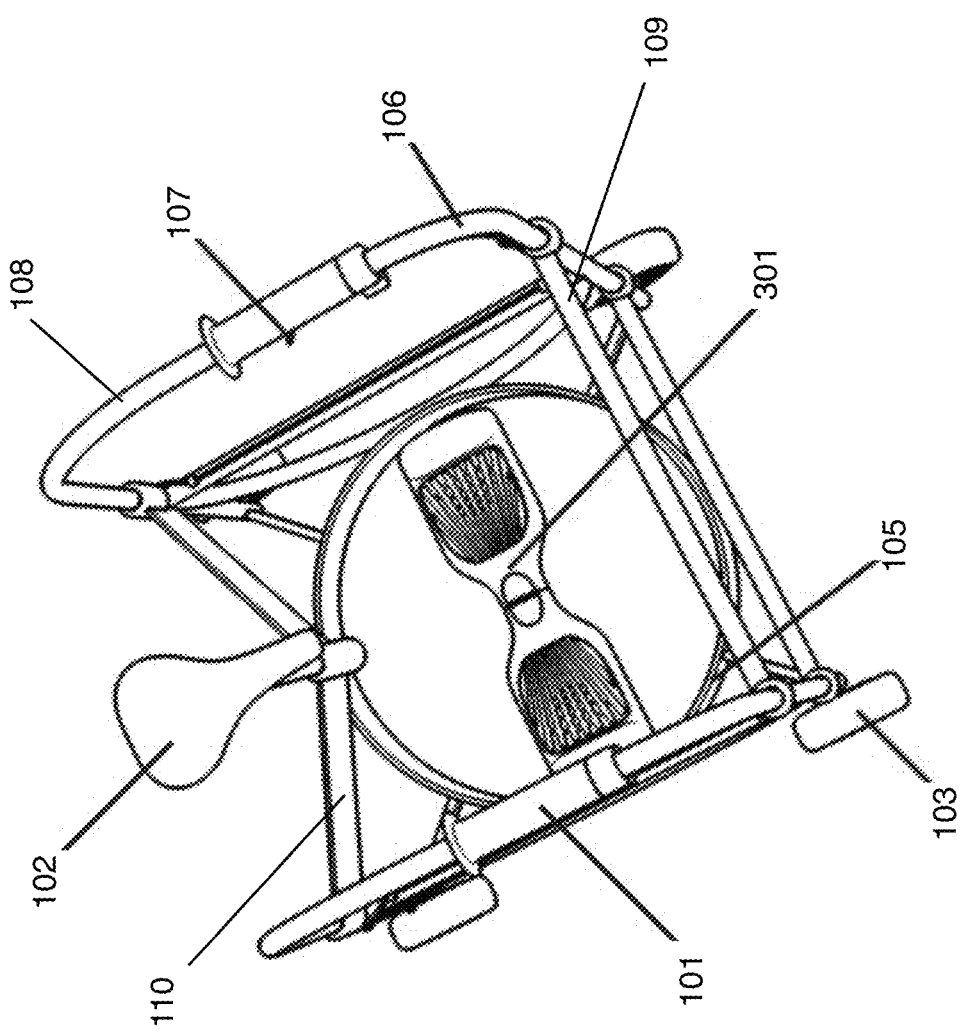
FIG. 3 shows a top perspective view of a walker-shaped HOVERBOARD attachment in accordance with one embodiment of the invention.

With respect to FIG. 3, a top perspective view of a walker-shaped HOVERBOARD attachment in accordance with one embodiment of the invention is shown. In the embodiment depicted, a viewer may perceive HOVERBOARD 301, as well as grips 101, seat 102, wheels 103, ring 105, walker frame 106, brakes 107, support rail 108, crossbar 109, and seat support bar 110.

FIG. 3 discloses the open space of ring 105 around HOVERBOARD 301 and discloses some of the area that a user may have to work with when operating HOVERBOARD 301.

Figure 4:
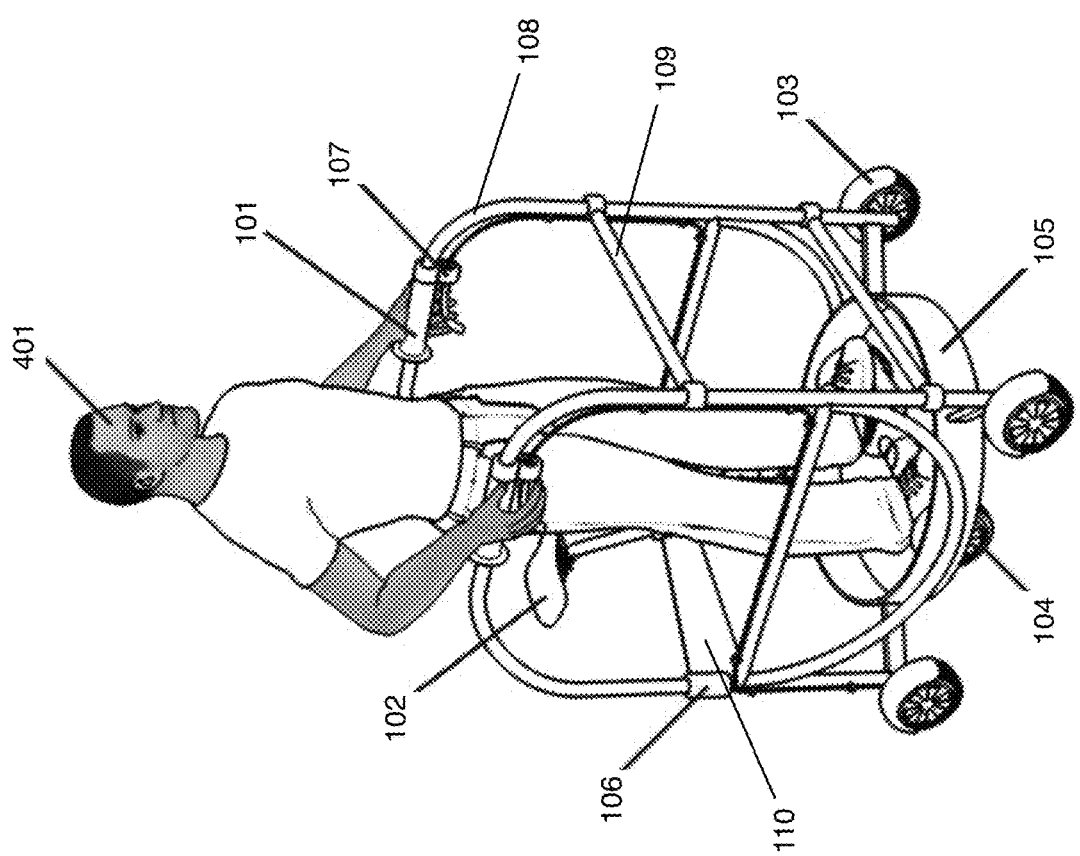
FIG. 4 shows a side perspective view of a walker-shaped HOVERBOARD attachment in use in accordance with one embodiment of the invention.

With respect to FIG. 4, a side perspective view of a walker-shaped HOVERBOARD attachment in use in accordance with one embodiment of the invention is shown. In the embodiment depicted, a viewer may perceive user 401, as well as grips 101, seat 102, wheels 103, motorized wheels 104, ring 105, walker frame 106, brakes 107, support rail 108, crossbar 109, and seat support bar 110.

Although user 401 is depicted as walking erect in FIG. 4, it is contemplated that the present invention may be configured to assist a user 401 in other postures. In such embodiments, any of grips 101, seat 102, wheels 103, motorized wheels 104, ring 105, walker frame 106, brakes 107, support rail 108, and crossbar 109 may be of different size or configuration. Most likely, were user 401 to be hunched-over, in one or more embodiments, walker frame 106, support rail 108, and crossbar 109 in particular may be of different height or size than depicted in FIG. 4.

CONCLUSIONS, RAMIFICATIONS, AND SCOPE

Although the present invention has been described with a degree of particularity, it is understood that the present disclosure has been made by way of example and that other versions are possible. As various changes may be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the walker-shaped HOVERBOARD attachment generally described herein has been disclosed in connection with a number of embodiments shown and described in detail, various modifications should be readily apparent to those of skill in the art.

What is claimed is:

1. An attachment for walker-shaped mobility assistance device, comprising:
   a platform defining at least one cavity and a rim surrounding the cavity, wherein the rim is configured to rest on either side of a mobility assistance device;
   at least one wheel disposed on the platform;
   at least one support rail fixedly connected to the platform, wherein the at least one support rail extends orthogonally up from the platform;
   at least one grip disposed on the at least one support rail;
   at least one brake disposed on the at least one grip;
   at least one seat support bar fixedly connected to the at least one support rail; and
   at least one seat fixedly connected to the at least one seat support bar, wherein an end of the at least one seat support bar closest to the at least one seat is positioned closer to the inside of the rim than the opposite seat support bar end, thus positioning the seat above a center of the rim's cavity.

2. The attachment for walker-shaped mobility assistance device of claim 1, wherein the at least one support rail is two arcuate support rails.

3. The attachment for walker-shaped mobility assistance device of claim 1, further comprising at least one crossbar orthogonally disposed across at least two support rails.

4. The attachment for walker-shaped mobility assistance device of claim 3, wherein the combination of crossbars and support rails is configured in the shape of a walker.

5. The attachment for walker-shaped mobility assistance device of claim 1, wherein the at least one wheel is four wheels.

6. The attachment for walker-shaped mobility assistance device of claim 5, wherein the at least one support rail is two arcuate support rails each having two ends, wherein each support rail end terminates at the inside of a wheel, and wherein each wheel is next to only one end.

7. The attachment for walker-shaped mobility assistance device of claim 1, wherein the at least one seat is a bicycle seat.

8. The attachment for walker-shaped mobility assistance device of claim 1, wherein the at least one seat support bar is two seat support bars, and wherein each seat support bar is fixedly connected to a support rail and to the seat.

* * * * *